United States Patent Office 3,205,264
Patented Sept. 7, 1965

3,205,264
PROCESS FOR THE PREPARATION OF 10,11-DIHYDRO-5-(γ-METHYL- AND DIMETHYL-AMINOPROPYLIDENE) - 5H - DIBENZO[a,d]CYCLOHEPTENE
Edward W. Tristram, Cranford, and Roger J. Tull, Plainfield, N.J., assignors to Merck & Co., Inc., Rahway, N.J., a corporation of New Jersey
No Drawing. Filed June 15, 1962, Ser. No. 202,721
4 Claims. (Cl. 260—570.8)

This invention relates to a novel method for making derivatives of dibenzocycloheptene and, more particularly, the invention relates to a method of making 5H-dibenzo-[a,d]-10,11-dihydrocycloheptenes which are substituted at the 5-carbon atom with an aminopropylidene radical.

The end compounds of the invention are useful in the treatment of mental health conditions as they are antidepressants and serve as mood elevators or psychic energizers. These are preferably administered in the form of their acid addition salts and these salts are included in the scope of this invention.

The compounds formed by the method of the invention may be represented by the general formula:

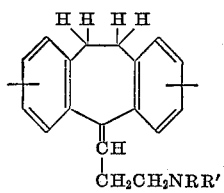

wherein R and R' are selected from the group consisting of hydrogen, lower alkyl radicals.

The method of the present invention may be illustrated schematically by the following flow sheet in which R and R' are as previously defined:

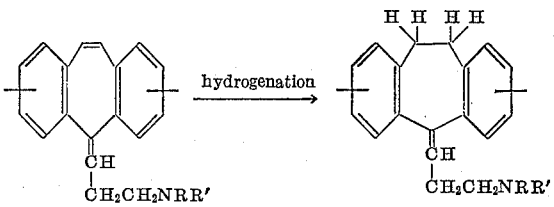

As shown in the flow sheet above, the method of the present invention involves the hydrogenation of an aminopropylidene derivative of a 5H-dibenzo-[a,d]-cycloheptene to produce the corresponding aminopropylidene derivatives of a 5H-dibenzo-[a,d]-10,11-dihydrocycloheptene. In a typical run, a solution of 5H-dibenzo-[a,d]-cycloheptene is hydrogenated with one mole of hydrogen to produce 5H-dibenzo-[a,d]-10,11-dihydrocycloheptene.

In accordance with the present invention, a variety of hydrogenation catalysts may be used, including Raney nickel, palladium on carbon, and platinum dioxide, to illustrate a few.

The starting material is preferably reacted with one mole of hydrogen in a suitable solvent, such as ethanol. After the requisite amount of hydrogen is absorbed by the unsaturated starting material, the reaction is stopped and the reaction mixture is filtered to remove the catalyst. The resulting solution then is acidified and concentrated to dryness under vacuum to yield a solid residue which is the crude product. Upon recrystallization from a suitable solvent there is obtained the desired dihydro product in high purity and in excellent yields.

The examples which follow will further illustrate the invention.

EXAMPLE 1

5-(γ-dimethylaminopropylidene)-5H-dibenzo-[a,d]-10,11-dihydrocycloheptene hydrochloride A solution of 5-(γ-dimethylaminopropylidene)-5H-dibenzo-[a,d]-cycloheptene (42 g.; 0.153 mole) in 105 ml. of ethanol is hydrogenated over Raney nickel (1.5 g.) at 65° under an initial hydrogen pressure of 450 lbs. After 1 mole of hydrogen is absorbed (3.5 hours), the reaction mixture is filtered to remove the catalyst and is acidified with 80 ml. of 2.5 N hydrochloric acid (0.2 mole). The acidic solution is concentrated to dryness under vacuum and is flushed three times with 100 ml. of benzene to remove residual water. The solid residue then is dried under vacuum at 40° to yield 44.9 g. (94% of theory) of the crude product, M.P. 187–189.5°, equivalent weight 307, ultraviolet absorption A% $2380^{432}$. Recrystallization from isopropyl alcohol and ether affords the product in high purity.

EXAMPLE 2

5-(γ-methylaminopropylidene)-5H-dibenzo-[a,d]-10,11-dihydrocycloheptene hydrochloride A solution of 5-(γ-methylaminopropylidene)-5H-dibenzo-[a,d]-cycloheptene (42 g.) in 105 ml. of ethanol is hydrogenated over Raney nickel (1.5 g.) at 65° under an initial hydrogen pressure of 450 lbs. After 1 mole of hydrogen is absorbed (3.5 hours), the reaction mixture is filtered to remove the catalyst and is acidified with 80 ml. of 2.5 N hydrochloric acid (0.2 mole). The acidic solution is concentrated to dryness under vacuum and is flushed three times with 100 ml. of benzene to remove residual water. The solid residue then is dried under vacuum at 40° to yield desired product.

What is claimed is:

1. A method for preparing 10,11-dihydro-5-(γ-methylaminopropylidene)-5H-dibenzo[a,d]cycloheptene from 5-(γ - methylaminopropylidene) - 5H - dibenzo[a,d]cycloheptene which comprises hydrogenating said latter compound by treating the same, in the presence of a hydrogenation catalyst, with up to about an equimolar amount of hydrogen, thereby forming said 10,11-dihydro-5-(γ-methylaminopropylidene) - 5H-dibenzo[a,d]cycloheptene and recovering the latter product.

2. The method of claim 1, wherein the hydrogenation catalyst is Raney nickel.

3. A method for preparing 10,11-dihydro-5-(γ-dimethylaminopropylidene)-5H-dibenzo[a,d]cycloheptene from 5 - (γ-dimethylaminopropylidene)-5H-dibenzo[a,d]cycloheptene which comprises hydrogenating said latter compound by treating the same, in the presence of a hydrogenation catalyst, with up to about an equimolar amount of hydrogen, thereby forming said 10,11-dihydro-5-(γ-dimethylaminopropylidene) - 5H-dibenzo[a,d]cycloheptene and recovering the latter product.

4. The process of claim 3, wherein the hydrogenation catalyst is Raney nickel.

References Cited by the Examiner

UNITED STATES PATENTS 3,073,847   1/63   Doebel et al. _____ 260—570.5 XR

FOREIGN PATENTS 858,188   1/61   Great Britain.

OTHER REFERENCES

Battersby et al.: "Jour. Chemical Society London," pages 2888–96 (1955).

Cope et al.: "Jour. American Chem. Soc." vol. 73, pages 1673–78 (1951).

Villani et al.: "Jour. of Medicinal and Pharm. Chem.," vol. 5, No. 2, pages 373–83 (1962).

CHARLES B. PARKER, *Primary Examiner.*

LEON ZITVER, *Examiner.*